United States Patent
Wessels et al.

(10) Patent No.: US 11,925,890 B2
(45) Date of Patent: Mar. 12, 2024

(54) MONITORING DEVICES FOR AIR FILTRATION SYSTEMS

(71) Applicant: Donaldson Company, Inc., Minneapolis, MN (US)

(72) Inventors: Wade A. Wessels, Minnetonka, MN (US); Peter P. Vitko, St. Paul, MN (US); Brent R. Nelson, Savage, MN (US)

(73) Assignee: Donaldson Company, Inc., Bloomington, MN (US)

( * ) Notice: Subject to any disclaimer, the term of this patent is extended or adjusted under 35 U.S.C. 154(b) by 219 days.

(21) Appl. No.: 17/288,486

(22) PCT Filed: Oct. 23, 2019

(86) PCT No.: PCT/US2019/057620
§ 371 (c)(1),
(2) Date: Apr. 23, 2021

(87) PCT Pub. No.: WO2020/086695
PCT Pub. Date: Apr. 30, 2020

(65) Prior Publication Data
US 2021/0387127 A1 Dec. 16, 2021

Related U.S. Application Data

(60) Provisional application No. 62/750,638, filed on Oct. 25, 2018.

(51) Int. Cl.
*B01D 46/44* (2006.01)
*B01D 46/00* (2022.01)
(Continued)

(52) U.S. Cl.
CPC ....... *B01D 46/446* (2013.01); *B01D 46/0086* (2013.01); *B01D 46/429* (2013.01);
(Continued)

(58) Field of Classification Search
None
See application file for complete search history.

(56) References Cited

U.S. PATENT DOCUMENTS 3,942,962 A 3/1976 Duyckinck
4,218,227 A 8/1980 Frey et al.
(Continued)

FOREIGN PATENT DOCUMENTS

CA 2810259 9/2014
CN 1619277 5/2005
(Continued)

OTHER PUBLICATIONS

TW201806656A_ENG (Espacenet machine translation of Hsu) (Year: 2018).*
(Continued)

*Primary Examiner* — Gabriel E Gitman
(74) *Attorney, Agent, or Firm* — Pauly, DeVries Smith & Deffner LLC

(57) ABSTRACT

Aspects herein include monitoring devices for filtration systems. An embodiment of the monitoring device can include a first fluid conduit and a first pressure sensor, wherein the first pressure sensor is in fluid communication with the first fluid conduit. The monitoring device can also include a second fluid conduit and a second pressure sensor, wherein the second pressure sensor is in fluid communication with the second fluid conduit. The monitoring device can also include a control circuit in electronic communication with the first pressure sensor and the second pressure sensor. The monitoring device can also include a housing, wherein the first pressure sensor, the second pressure sensor and the control circuit are all disposed within the housing. Other embodiments are also included herein.

19 Claims, 10 Drawing Sheets

(51) Int. Cl.
  *B01D 46/42* (2006.01)
  *B01D 46/71* (2022.01)
  *B01D 37/04* (2006.01)
  *G01L 19/00* (2006.01)

(52) U.S. Cl.
  CPC .......... *B01D 46/448* (2013.01); *B01D 46/71* (2022.01); *B01D 37/046* (2013.01); *G01L 2019/0053* (2013.01)

(56) References Cited

U.S. PATENT DOCUMENTS

| | | | |
|---|---|---|---|
| 4,308,585 A * | 12/1981 | Jordan | G11C 5/00 700/74 |
| 4,395,269 A | 7/1983 | Schuler | |
| 5,391,218 A | 2/1995 | Jorgenson et al. | |
| 5,907,491 A | 5/1999 | Canada et al. | |
| 6,090,173 A | 7/2000 | Johnson et al. | |
| 6,138,078 A | 10/2000 | Canada et al. | |
| 6,471,853 B1 | 10/2002 | Moscaritolo | |
| 6,740,412 B2 | 5/2004 | Oreins et al. | |
| 6,902,502 B2 | 6/2005 | Murakami et al. | |
| 6,936,160 B2 | 8/2005 | Moscaritolo et al. | |
| 7,641,708 B2 | 1/2010 | Kosmider et al. | |
| 7,866,337 B2 * | 1/2011 | Chinnock | G05D 7/0635 137/859 |
| 8,261,540 B2 * | 9/2012 | Konstandopoulos | F01N 11/002 60/303 |
| 9,084,956 B2 | 7/2015 | Morgan | |
| 9,183,723 B2 * | 11/2015 | Sherman | F24F 11/526 |
| 9,195,384 B2 | 11/2015 | Fuhrmann, Jr. et al. | |
| 9,983,114 B2 | 5/2018 | Henderson et al. | |
| 10,065,143 B2 | 9/2018 | Beier | |
| 10,363,509 B2 | 7/2019 | Arthur et al. | |
| 10,382,957 B2 | 8/2019 | Patel et al. | |
| 10,401,881 B2 | 9/2019 | Ewens et al. | |
| 2004/0217872 A1 | 11/2004 | Bhardwaj et al. | |
| 2005/0247194 A1 * | 11/2005 | Kang | B01D 46/444 95/25 |
| 2006/0100796 A1 * | 5/2006 | Fraden | A47L 9/19 702/50 |
| 2006/0112667 A1 | 6/2006 | Sporre et al. | |
| 2011/0185895 A1 | 8/2011 | Freen | |
| 2012/0318073 A1 * | 12/2012 | Zavodny | B01D 46/42 73/862.581 |
| 2013/0233081 A1 | 9/2013 | Zhu et al. | |
| 2014/0260984 A1 | 9/2014 | Morgan | |
| 2014/0300460 A1 * | 10/2014 | Strahan | G01L 17/00 340/442 |
| 2015/0059583 A1 | 3/2015 | Cornell | |
| 2017/0043290 A1 | 2/2017 | Segard | |
| 2017/0246486 A1 | 8/2017 | Cazier et al. | |
| 2017/0306788 A1 | 10/2017 | Vega et al. | |
| 2017/0315009 A1 * | 11/2017 | Riethmueller | G01L 13/00 |
| 2018/0133639 A1 | 5/2018 | Reid et al. | |
| 2018/0140989 A1 * | 5/2018 | Arthur | B01D 46/521 |
| 2018/0345198 A1 | 12/2018 | Kippel et al. | |
| 2019/0003738 A1 | 1/2019 | Kah, III | |
| 2019/0041079 A1 | 2/2019 | Kohn et al. | |
| 2019/0232210 A1 | 8/2019 | Hur et al. | |

FOREIGN PATENT DOCUMENTS

| | | | |
|---|---|---|---|
| CN | 102621937 | 8/2012 | |
| CN | 204672034 | 9/2015 | |
| CN | 106714942 | 5/2017 | |
| CN | 109224665 | 1/2019 | |
| CN | 209204875 | 8/2019 | |
| EP | 1031369 A1 * | 8/2000 | ......... B01D 46/0068 |
| EP | 2972632 | 12/2019 | |
| JP | 4194791 | 10/2008 | |
| KR | 101390201 | 5/2014 | |
| TW | 201806656 A * | 3/2018 | ............ B01D 35/14 |
| WO | 03067350 | 8/2003 | |
| WO | 2007080393 | 7/2007 | |
| WO | 2018031403 | 2/2018 | |
| WO | 2019151684 | 8/2019 | |
| WO | 2020086695 | 4/2020 | |

OTHER PUBLICATIONS

"Communication Pursuant to Article 94(3) EPC," for European Patent Application No. 19802435.8 dated Jul. 4, 2022 (4 pages).
"First Office Action," for Chinese Patent Application No. 201980700471 dated Jun. 6, 2022 (28 pages) with English Translation.
"International Preliminary Report on Patentability," for PCT Application No. PCT/US2019/057620 dated May 6, 2021 (7 pages).
"International Search Report and Written Opinion," for PCT Application No. PCT/US2019/057620 dated Jan. 17, 2020 (10 pages).
"First Examination Report," for Indian Patent Application No. 20211706265 dated Sep. 30, 2022 (7 pages).
"Office Action," for Brazilian Patent Application No. BR112021007554-2 dated Jun. 22, 2023 (7 pages) with English Summary.
"Second Office Action," for Chinese Patent Application No. 201980700471 dated Jan. 31, 2023 (25 pages).
"Third Office Action," for Chinese Patent Application No. 20198070471 dated Jul. 12, 2023 (25 pages) with English Translation.
"Final Rejection," for Chinese Patent Application 201980070471.0 dated Oct. 24, 2023 (21 pages) with English Translation.

* cited by examiner

MONITORING DEVICES FOR AIR FILTRATION SYSTEMS

This application is being filed as a PCT International Patent application on Oct. 23, 2019 in the name of Donaldson Company, Inc., a U.S. national corporation, applicant for the designation of all countries and Wade A. Wessels, a U.S. Citizen, Peter P. Vitko, a U.S. Citizen and Brent R. Nelson, a U.S. Citizen, inventors for the designation of all countries, and claims priority to U.S. Provisional Patent Application No. 62/750,638, filed Oct. 25, 2018, the contents of which are herein incorporated by reference in its/their entirety/entireties.

FIELD

Embodiments herein relate to monitoring devices for filtration systems, systems including monitoring devices, and related methods.

BACKGROUND

Many industries encounter particulate matter suspended in the atmosphere. In some industries, this particulate matter is a valuable product (for example, starch), and it would be beneficial if the suspended particulate matter could be recovered and reintroduced into the process. For other industries (for example, metal or wood working), it may be desirable to remove the particulate matter from the air to provide a clear working environment.

Particulate matter can also be a concern in air intake streams to engines for motorized vehicles or power generation equipment, gas streams directed to gas turbines, and air streams to various combustion furnaces. In those contexts, the particulate material, should it reach the internal workings of the various mechanisms involved, can cause substantial damage thereto.

A variety of air filter or gas filter arrangements have been developed for particulate removal. In some scenarios, systems for cleaning an air or other gas stream laden with particulate matter include air filter assemblies that have filter elements disposed in a housing. The filter element may be a bag, sock or cartridge including a suitable filter media, e.g., fabric, pleated paper, etc. The gas stream contaminated with particulate matter is typically passed through the housing so that the particulate matter is captured and retained by one or more filter elements.

SUMMARY

Embodiments include monitoring devices for filtration systems, systems including monitoring devices, and related methods. In an embodiment, a monitoring device for a filtration system is included. The monitoring device can include a first fluid conduit and a first pressure sensor, wherein the first pressure sensor is in fluid communication with the first fluid conduit. The monitoring device can also include a second fluid conduit and a second pressure sensor, wherein the second pressure sensor is in fluid communication with the second fluid conduit. The monitoring device can also include a control circuit in electronic communication with the first pressure sensor and the second pressure sensor. The monitoring device can also include a housing, wherein the first pressure sensor, the second pressure sensor and the control circuit are all disposed within the housing.

In an embodiment, an air filtration system is included. The air filtration system can include a housing configured to receive a filter element therein through which a fluid flow passes, the filter element comprising an upstream side and a downstream side. The system can also include a monitoring device including a first fluid conduit in fluid communication the upstream side of the filter element and a first pressure sensor, wherein the first pressure sensor is in fluid communication with the first fluid conduit. The monitoring device can also include a second fluid conduit in fluid communication with the downstream side of the filter element and a second pressure sensor, wherein the second pressure sensor is in fluid communication with the second fluid conduit. The monitoring device can also include a monitoring device control circuit in electronic communication with the first pressure sensor and the second pressure sensor. The monitoring device can also include a housing, wherein the first pressure sensor, the second pressure sensor and the control circuit are all disposed within the housing.

In an embodiment, a method of remotely monitoring a pre-installed dust collector system is included. The method can include mounting a monitoring device on an external surface of a housing of the pre-installed dust collector system. The monitoring device can include a first fluid conduit and a first pressure sensor, wherein the first pressure sensor is in fluid communication with the first fluid conduit. The monitoring device can also include a second fluid conduit and a second pressure sensor, wherein the second pressure sensor is in fluid communication with the second fluid conduit. The monitoring device can also include a control circuit in electronic communication with the first pressure sensor and the second pressure sensor. The monitoring device can also include a housing, wherein the first pressure sensor, the second pressure sensor and the control circuit are all disposed within the housing.

In an embodiment, a kit for a monitoring device is included. The kit can include a first fluid conduit and a first junction for connecting the first fluid conduit to a first preexisting fluid conduit of a filtration system. The kit can include a second fluid conduit and a second junction for connecting the second fluid conduit to a second preexisting fluid conduit of a filtration system. The kit can also include a monitoring device. The monitoring device can include a first pressure sensor for sensing pressure in the first fluid conduit. The monitoring device can also include a second pressure sensor for sensing pressure in the second fluid conduit. The monitoring device can also include a monitoring device control circuit in electronic communication with the first pressure sensor and the second pressure sensor. The monitoring device can also include a housing, wherein the first pressure sensor, the second pressure sensor and the control circuit are all disposed within the housing.

This summary is an overview of some of the teachings of the present application and is not intended to be an exclusive or exhaustive treatment of the present subject matter. Further details are found in the detailed description and appended claims. Other aspects will be apparent to persons skilled in the art upon reading and understanding the following detailed description and viewing the drawings that form a part thereof, each of which is not to be taken in a limiting sense. The scope herein is defined by the appended claims and their legal equivalents.

BRIEF DESCRIPTION OF THE FIGURES

Aspects may be more completely understood in connection with the following drawings, in which.

Figure 1:
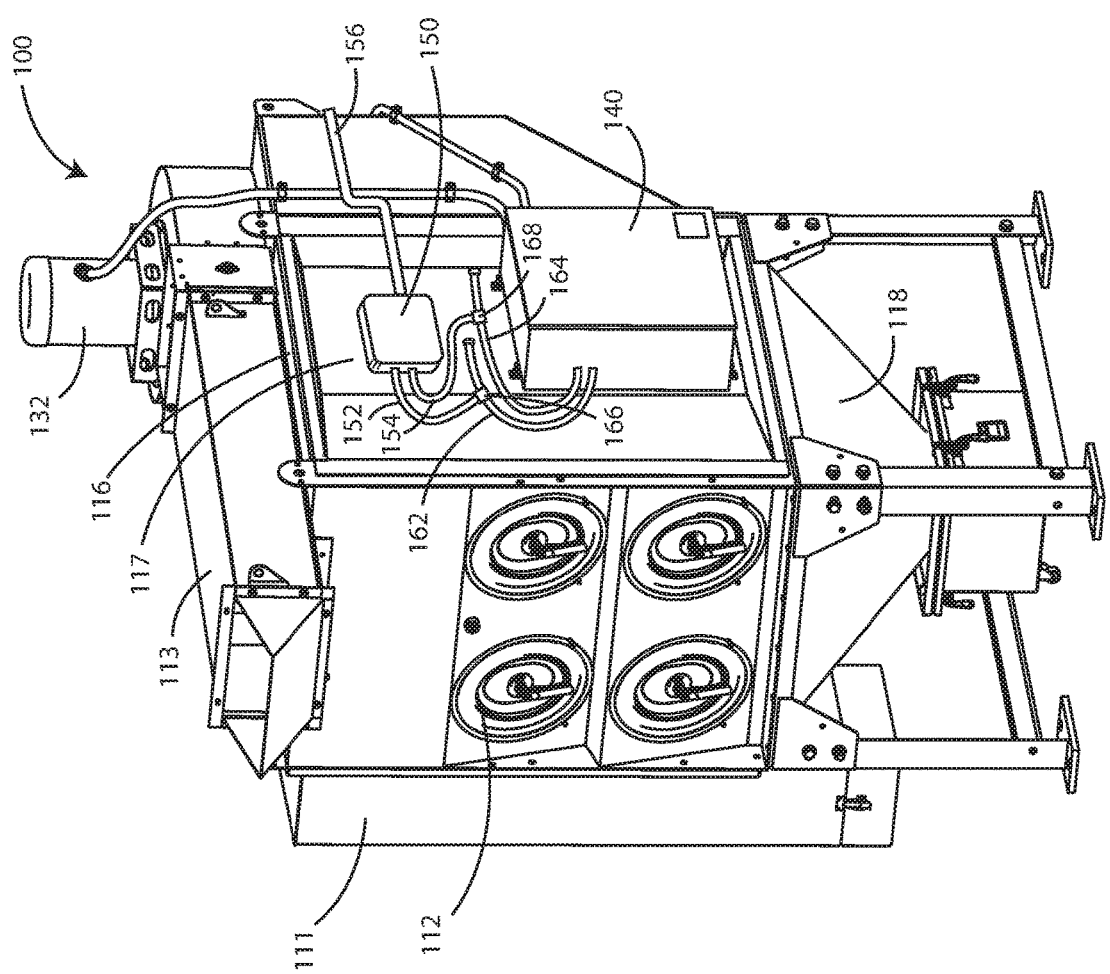
FIG. 1 is a schematic front perspective view of an air filtration system with a monitoring device in accordance with various embodiments herein.

While embodiments are susceptible to various modifications and alternative forms, specifics thereof have been shown by way of example and drawings, and will be described in detail. It should be understood, however, that the scope herein is not limited to the particular embodiments described. On the contrary, the intention is to cover modifications, equivalents, and alternatives falling within the spirit and scope herein.

DETAILED DESCRIPTION

As described above, there are many scenarios in which filtering particulate matter out of air streams is useful and many different types of air filtration systems to accomplish the same. In one type of an air filtration system, the system has a clean air chamber (or clean/downstream side) and a dirty air chamber (or dirty/upstream side). The two chambers can be separated by a structure that can be referred to as a tube sheet. In many cases, the tube sheet has a number of openings so that air can pass between the clean and dirty air chambers. The filter elements can be positioned over the openings so that particulate-laden air (dirty air) introduced into the dirty air chamber must pass through a filter element to move into the clean air chamber. The particulate matter in the dirty air collects on the filter elements as the air moves through the filter elements. From the clean air chamber, the cleaned air is exhausted into the environment, or recirculated for other uses.

As the filter elements capture particulate matter, flow through the system is inhibited and periodic cleaning of the filter elements can be performed to increase air flow though the system. Cleaning can be accomplished by periodically pulsing a brief jet of air, such as pressurized air into, the interior of the filter element (which could include a filter cartridge, filter bag, or the like) to reverse the air flow through the filter element, causing the collected particulate matter to be driven off the filter element. In some cases, pressurized air can be directed into pulse collectors as described in, e.g. U.S. Pat. No. 3,942,962 (Duyckinck), U.S. Pat. No. 4,218,227 (Frey). U.S. Pat. No. 6,090,173 (Johnson et al.), U.S. Pat. Nos. 4,395,269, 6,902,592 (Green et al.). U.S. Pat. No. 7,641,708 (Kosmider et al.), and US Patent Application Publication US 2006/0112667 A1, the content of all of which is herein incorporated by reference.

Keeping these air filtration systems working optimally can involve periodic maintenance including, but not limited to, replacing/cleaning filter elements, monitoring and replacing pulse valves, and the like. Monitoring aspects of the system can provide indications regarding the optimal time for performing such maintenance activities as well as identifying any other issues that may impact filtration system performance. Being able to remotely monitor such systems can be even more advantageous as information from observations of many different systems can be aggregated and analyzed and then brought to bear to increase the accuracy of determinations such as the proper time to perform system maintenance.

Many filtrations systems are constructed robustly such that their service life can span decades assuming proper maintenance is performed. As a result, however, this means that advanced technology including sensors and processors may be slow to be implemented if only provided as part of the original equipment.

In accordance with various embodiments herein, monitoring devices are included that can be easily installed on existing filtration systems that otherwise lack such monitoring capabilities. In this manner, existing filtration system can be retrofit to include advanced monitoring capabilities.

Referring now to FIG. 1, a schematic front perspective view is shown of an air filtration system 100 with a monitoring device 150 in accordance with various embodiments herein. In this example, the air filtration system 100 depicted in FIG. 1 is generally in the shape of a box and includes an upper wall panel 116, and two pairs of opposite side wall panels 117 (one of which is depicted in FIG. 1). It will be appreciated, however, that the air filtration system 100 can take on many different shapes and configurations.

The air filtration system 100 includes a dirty air conduit 11 for receiving dirty or contaminated air (i.e., air with particulate matter therein) into the air filtration system 100. A clean air conduit 113 (see, e.g., FIG. 2) can be provided for venting clean or filtered air from the air filtration system 100. The air filtration system 100 includes access openings 112 for multiple filter elements (not shown in FIG. 1). In use, each of the access openings 112 is sealed by a cover (not shown) such that dirty air entering the air filtration system 100 does not escape through the access openings 112.

The air filtration system 100 may also include a hopper 118 to collect particulate matter separated from the dirty air stream as described herein. The hopper 118 may include sloped walls to facilitate collection of the particulate matter and may, in some embodiments, include a driven auger or other mechanism for removing the collected particulate matter.

In some embodiments, the air filtration system 100 can include a fan 132 to provide movement of air through the air filtration system 100. However, in other embodiments, air can be pulled through the system with a fan or other equipment that is not part of the air filtration system 100. The air filtration system 100 can include a preexisting control box 140, which can include a preexisting control circuit for the filtration system.

The monitoring device 150 can be connected to a first fluid conduit 152, a second fluid conduit 154, and third fluid conduit 156. The fluid conduits can provide fluid communication between various parts of the filtration system (such as the dirty/upstream side, the clean/downstream side, a compressed air supply, etc.) and sensors/transducers that can be within or otherwise associated with the monitoring device 150. The first fluid conduit 152 can be connected to an existing fluid conduit 162 of the air filtration system that provides fluid communication with an area of fluid flow that is upstream from the filtration element(s). In some embodiments, the first fluid conduit 152 can be connected to the existing fluid conduit 162 using a junction 166 (such as a T-junction, splice junction, or other connecting structure). The second fluid conduit 154 can be connected to an existing fluid conduit 164 of the air filtration system that provides fluid communication with an area of fluid flow that is downstream from the filtration element(s). In some embodiments, the second fluid conduit 154 can be connected to the existing fluid conduit 164 using a junction 168 (such as a T-junction, splice junction, or other similar connecting structure).

In some embodiments, there is no electrical communication between the preexisting control box 140 and/or components therein such as a preexisting control circuit and the monitoring device 150. While not intending to be bound by theory, it is believed that this electronic separation can offer a security advantage as the preexisting control box 140 and components therein are responsible for operation of the filtration system 100 whereas the monitoring device 150 is only responsible for monitoring of the filtration system 100. In this way, the monitoring device 150 cannot be used as a means of gaining control over operation of the filtration system 100.

Figure 2:
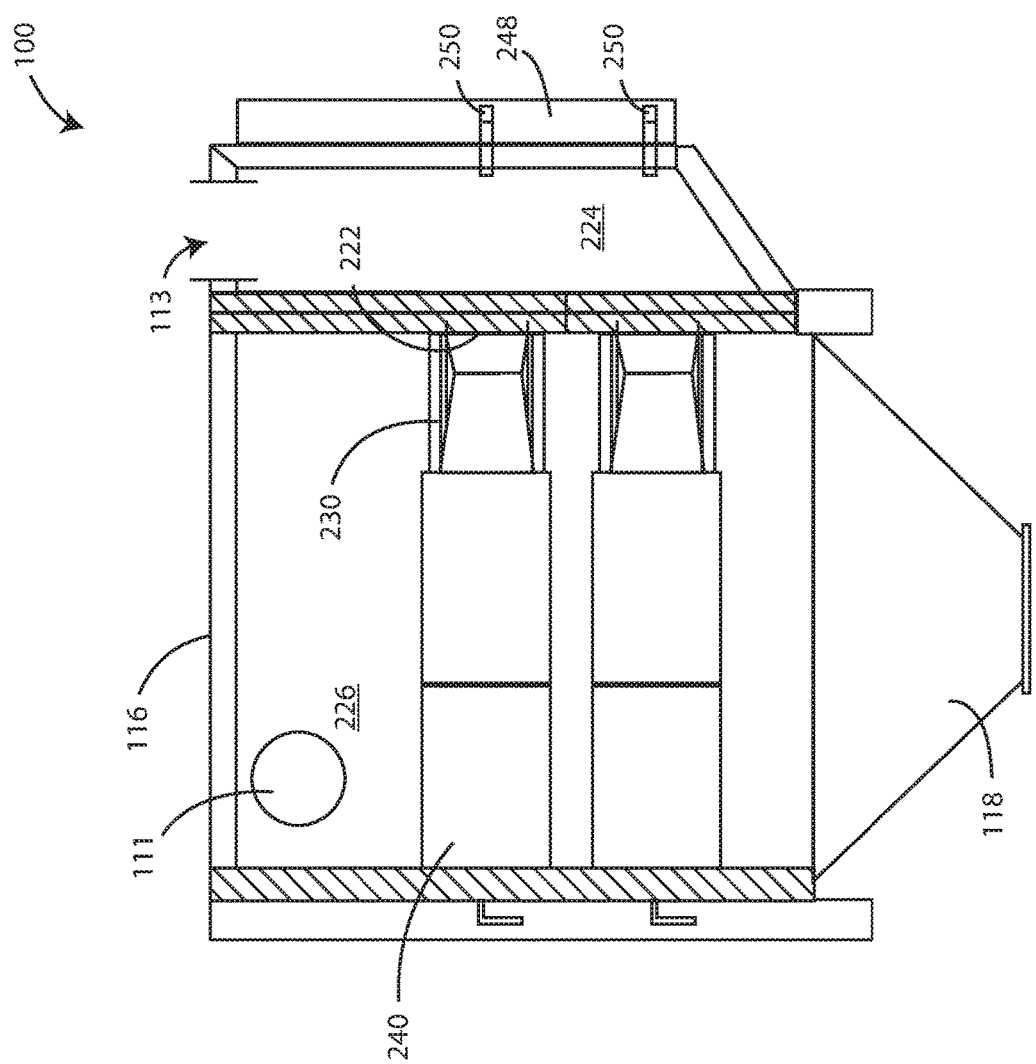
FIG. 2 is a schematic cross-sectional view of some aspects of an air filtration system in accordance with various embodiments herein.

Referring now to FIG. 2, a schematic cross-sectional view is shown of some aspects of an air filtration system 100 in accordance with various embodiments herein. The interior of the air filtration system 100 includes a tube sheet 222 that separates the interior of the housing into a clean air chamber 224 and a dirty air chamber 226. The air filtration system 100 includes a clean air conduit 113 through which clean air exits from the clean air chamber 224 during operation of the air filtration system 100.

The depicted air filtration system 100 includes pulse collectors 230 and filter elements 240 in the dirty air chamber 226 (dirty side or upstream side). The pulse collectors 230 are attached to the tube sheet 222 over an aperture in the tube sheet 222 (not seen in FIG. 2) such that a pulse of air from the pulse generators 250 passing through the pulse collector 230 enters an interior volume of the filter elements 240. Air can be provided to the pulse generators 250 from a compressed air manifold 248, which itself can receive compressed air from an air compressor or central source of plant compressed air.

Figure 3:
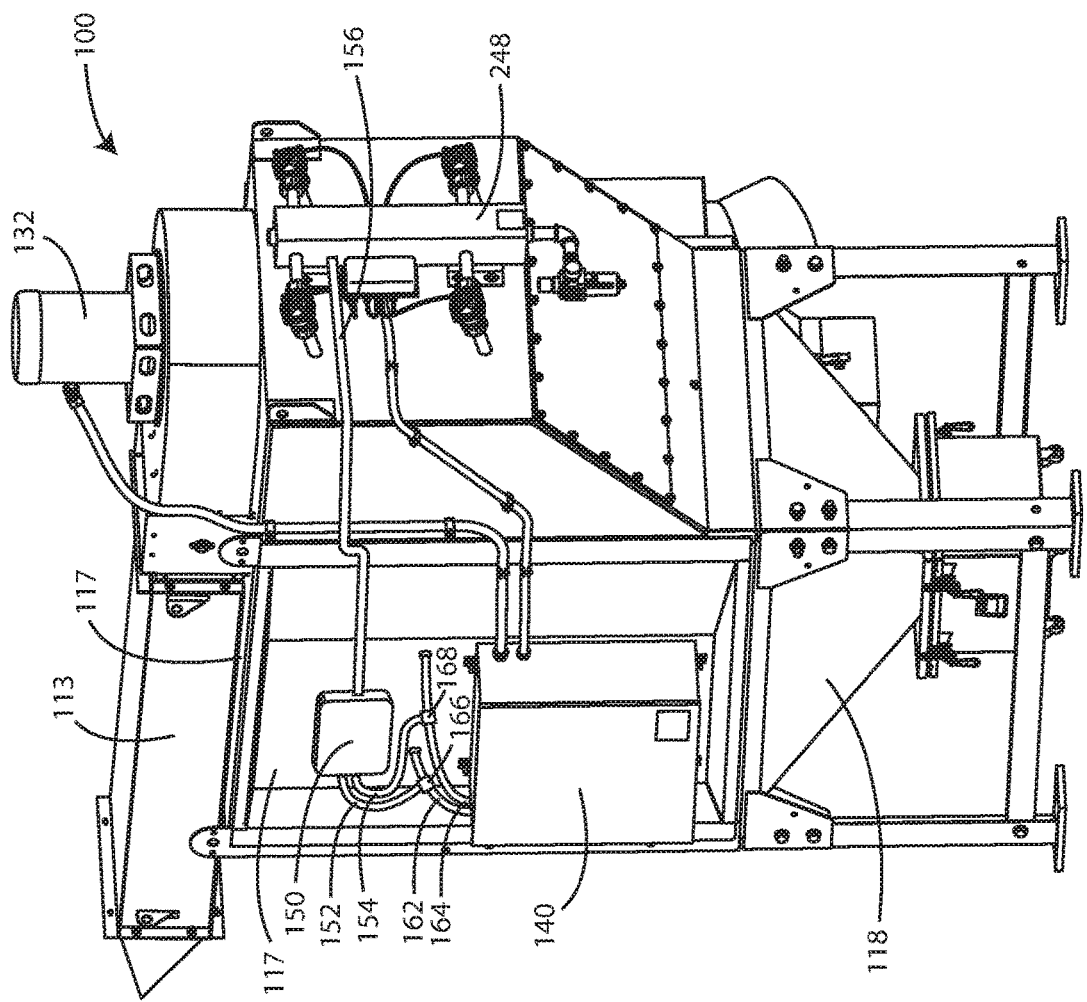
FIG. 3 is a schematic rear perspective view of an air filtration system with a monitoring device in accordance with various embodiments herein.

Referring now to FIG. 3, a schematic rear perspective view is shown of an air filtration system with a monitoring device in accordance with various embodiments herein. FIG. 3 shows many of the same elements as shown in FIGS. 1 and 2, but as a rear perspective view.

Figure 4:
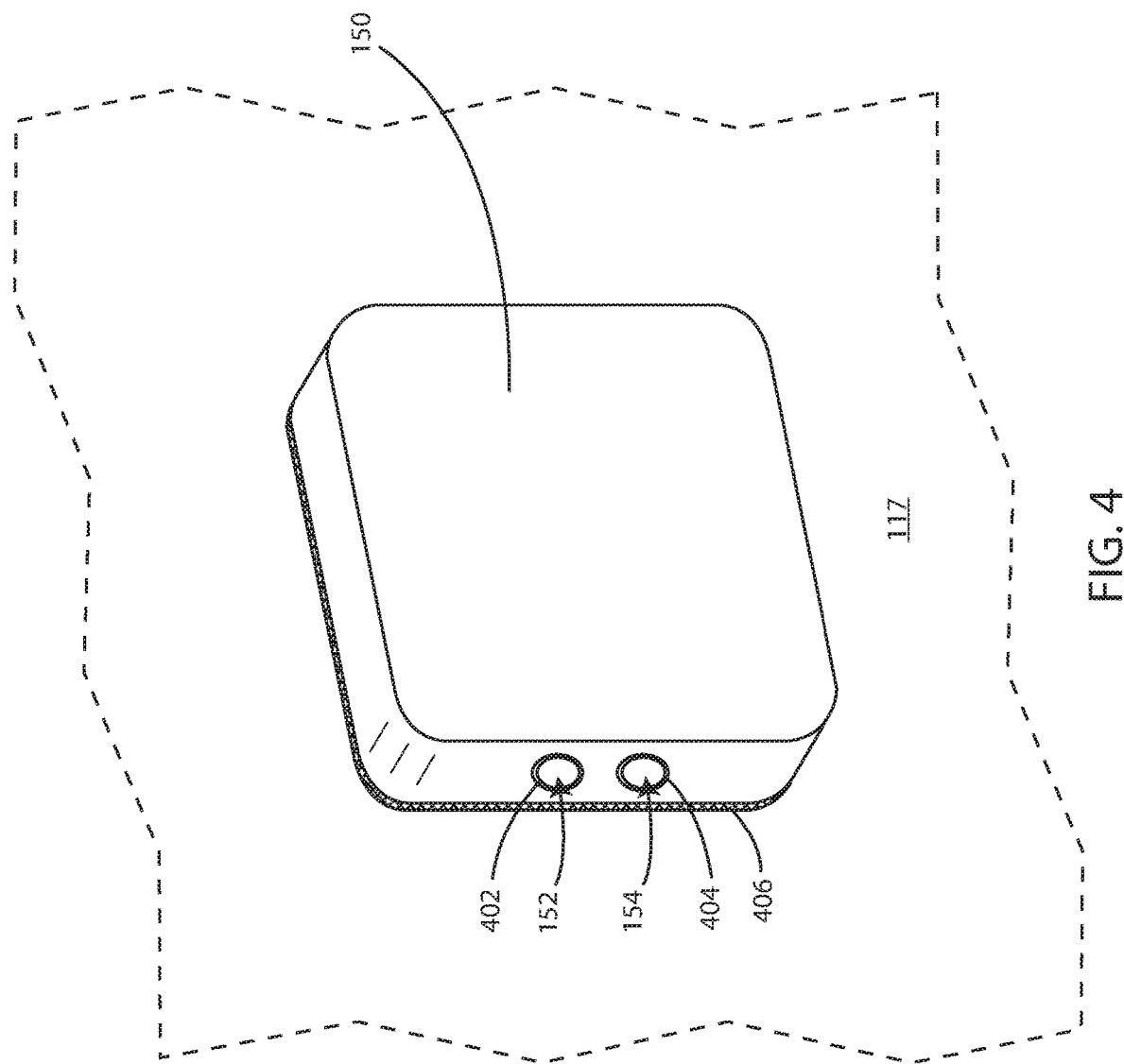
FIG. 4 is a schematic view of a monitoring device in accordance with various embodiments herein.

Referring now to FIG. 4, a schematic view is shown of a monitoring device 150 in accordance with various embodiments herein. The monitoring device 150 can include a first receptacle 402 or fitting to receive a tube or other conduit as part of the first fluid conduit 152. The monitoring device 150 can also include a second receptacle 404 or fitting to receive a tube or other conduit as part of the second fluid conduit 154. Although not shown in this figure, it will be appreciated that the monitoring device 150 can also include a third receptacle or fitting to receive a tube or other conduit as part of the third fluid conduit 156. In addition, various embodiments herein can include greater or lesser numbers of receptacle and/or fluid conduits.

In various embodiments, the monitoring device 150 can be mounted on a surface of the air filtration system 100 such as an external surface thereof. For example, in some embodiments, the monitoring device 150 can be mounted on a side wall panel 117. However, the monitoring device 150 can also be mounted in other locations including on top or bottom walls as well as inside the filtration system 100 and also mounted off the filtration system 100 (such as on a separate panel that is physically separated from other components of the system). The monitoring device can be mounted using various hardware including, but not limited to, using fasteners, adhesives, magnets, and the like. In a particular embodiment, an adhesive layer 406 is used to mount the housing of the monitoring device 150, which can be, for example, a pressure sensitive adhesive (PSA).

Figure 5:
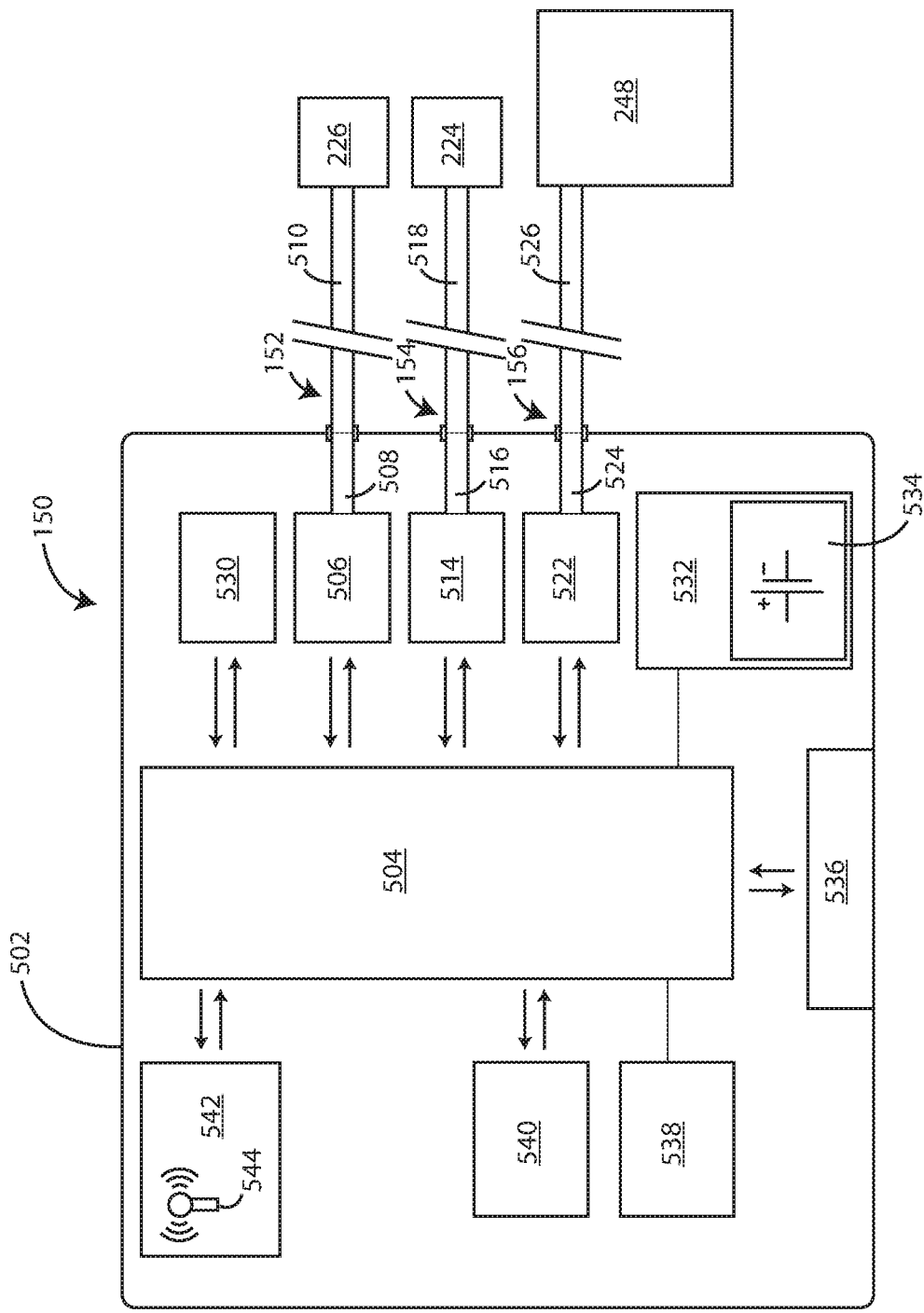
FIG. 5 is a schematic diagram of elements of a monitoring device in accordance with various embodiments herein.

Referring now to FIG. 5, a schematic diagram is shown of elements of a monitoring device 150 in accordance with various embodiments herein. It will be appreciated that a greater or lesser number of components can be included with various embodiments and that this schematic diagram is merely illustrative. The monitoring device 150 can include a housing 502 and a control circuit 504.

The control circuit 504 can include various electronic components including, but not limited to, a microprocessor, a microcontroller, a FPGA (field programmable gate array) chip, an application specific integrated circuit (ASIC), or the like.

In various embodiments, the monitoring device 150 can include a first pressure sensor 506 (as used herein, reference to a pressure sensor shall include a pressure transducer unless the context dictates otherwise) and a first fluid conduit 152 including an internal portion 508 and an external portion 510. The first fluid conduit can be in fluid communication with the dirty air chamber 226.

In various embodiments, the monitoring device 150 can include a second pressure sensor 514 and a second fluid conduit 154 including an internal portion 516 and an external portion 518. The second fluid conduit can be in fluid communication with the clean air chamber 224.

In various embodiments, the monitoring device 150 can include a third pressure sensor 522 and a third fluid conduit 156 including an internal portion 524 and an external portion 526. The third fluid conduit can be in fluid communication with the compressed air manifold 248. As such, the third fluid conduit can be in fluid communication with a compressed gas supply.

Pressure sensors herein can be of various types. Pressure sensors can include, but are not limited to, strain gauge type pressure sensors, capacitive type pressure sensors, piezoelectric type pressure sensors, and the like. In some embodiments, pressure sensors herein can be MEMS-based pressure sensors.

The processing power of the control circuit 504 and components thereof can be sufficient to perform various operations including various operations on data from sensors (such as pressure sensors 506, 514, and 522) including, but not limited to averaging, time-averaging, statistical analysis, normalizing, aggregating, sorting, deleting, traversing, transforming, condensing (such as eliminating selected data and/or converting the data to a less granular form), compressing (such as using a compression algorithm), merging, inserting, time-stamping, filtering, discarding outliers, calculating trends and trendlines (linear, logarithmic, polynomial, power, exponential, moving average, etc.), predicting filter element EOL (end of life), identifying an EOL condition, predicting performance, predicting costs associated with replacing filter elements vs. not-replacing filter elements, and the like.

Normalizing operations performed by the control circuit 504 can include, but are not limited to, adjusting one or more values based on another value or set of values. As just one example, pressure drop data reflective of pressure drop across a filter element can normalized by accounting for air flow rate or a value that serves as a proxy thereof.

In various embodiments the control circuit can calculate a time for replacement of a filter element and generate a signal regarding the time for replacement. In various embodiments, the control circuit can calculate a time for replacement of a filter element and issue a notification regarding the time for replacement through a user output device. In various embodiments, the control circuit can calculate a time for replacement of a filter element based on signals from the first pressure sensor and the second pressure sensor. In various embodiments, the control circuit can calculate a time for replacement of a filter element based on signals from the first pressure sensor and the second pressure sensor and an external input. The external input can be received from a system user or from a remote location through a data communication network.

In various embodiments, control circuit initiates an alarm if a predetermined alarm condition has been met. The alarm condition can include one or more a maximum value for a signal received from the first pressure sensor, a minimum value for a signal received from the first pressure sensor, a maximum value for a signal received from the second pressure sensor, a minimum value for a signal received from the second pressure sensor, a maximum difference between a value for a signal received from the first pressure sensor and a value for a signal received from the second pressure sensor, and a minimum difference between a value for a signal received from the first pressure sensor and a value for a signal received from the second pressure sensor.

In various embodiments, the control circuit 504 can be configured to calculate a value correlated to a fluid flow rate through the filtration system based on a value provided by the first pressure sensor and a value provided by the second pressure sensor. In some embodiments, the control circuit 504 can be configured to calculate a value correlated to a fluid flow rate through the filtration system based on a static pressure value, wherein the static pressure value by a signal from at least one of the first pressure sensor and the second pressure sensor. In some embodiments, the control circuit can be configured to calculate a value correlated to a fluid flow rate through the filtration system based on a differential pressure value and a static pressure value, wherein the differential pressure value is determined by a signal from both the first pressure sensor relative and the second pressure sensor and the static pressure value by a signal from one of the first pressure sensor and the second pressure sensor.

The fluid flow rate of the system is determined by the characteristics of the motive source. For fan-based applications, the relationship between the static pressure and fluid flow is generally inverse in nature. As the system resistance increases, measured as static pressure, the fluid flow rate decreases and vice versa due to the operating characteristics of the fan. Since the fluid flow rate of the fan directly affects the fluid flow rate in other parts of the system, a fluid flow rate proxy for the fan and hence the filtration system can be calculated using the static pressure at a fixed location in the system. Generally, the static pressure in a fluid duct is proportional to the square of the fluid flow rate. As one example, the flow rate proxy value can be calculated according to the equation $$FRP = \sqrt{\left(\frac{P_S}{P_i}\right)} \times Q_i,$$

wherein FRP=flow rate proxy value, Ps is a static pressure value. Pi is the system design point static pressure, and Qi is an optional system design point fluid flow rate.

In some embodiments, a fan curve can also be used to calculate a value for a flow rate. The fan curve can be used to relate a static pressure with a flow rate. In various embodiments, the monitoring device 150 can store a fan curve in memory (which can be written to memory when the monitoring device 150 is manufactured or it can be received/updated based on data received through a network connection while the monitoring device 150 is being installed or after it is installed on a filtration system in the field).

In some embodiments, the monitoring device 150 can include an additional sensor, such as an accelerometer. For example, the monitoring device 150 can include a 3-axis accelerometer 530. The 3-axis accelerometer 530 can be used to detect vibrations transmitted from the filtration system to the monitoring device 150. The vibrations can result from various events such as periodically pulsing a brief jet of pressurized air into the interior of the filter element to reverse the air flow through the filter element and/or valve(s) opening or closing to accomplish the same.

In some cases, it can be helpful to mount an accelerometer in the monitoring device 150 such that it receives vibrations from the filtration system with minimal diminishment of vibration in terms of frequency range and amplitude. In some embodiments, the accelerometer can be disposed within the housing such that vibrations incident upon a contact surface of the monitoring device housing are attenuated by less than 50% as incident upon the accelerometer. In some embodiments, the accelerometer can be disposed within the housing such that vibrations incident upon a contact surface of the monitoring device housing are attenuated by less than 10% as incident upon the accelerometer.

In various embodiments, the monitoring device 150 can include a power supply circuit 532. In some embodiments, the power supply circuit 532 can include various components including, but not limited to, a battery 534, a capacitor, a power-receiver such as a wireless power receiver, a transformer, a rectifier, and the like.

In various embodiments the monitoring device 150 can include an output device 536. The output device 536 can include various components for visual and/or audio output including, but not limited to, lights (such as LED lights), a display screen, a speaker, and the like. In some embodiments, the output device can be used to provide notifications or alerts to a system user such as current system status, an indication of a problem, a required user intervention, a proper time to perform a maintenance action, or the like.

In various embodiments the monitoring device 150 can include memory 538 and/or a memory controller. The memory can include various types of memory components including dynamic RAM (D-RAM), read only memory (ROM), static RAM (S-RAM), disk storage, flash memory. EEPROM, battery-backed RAM such as S-RAM or D-RAM and any other type of digital data storage component. In some embodiments, the electronic circuit or electronic component includes volatile memory. In some embodiments, the electronic circuit or electronic component includes non-volatile memory. In some embodiments, the electronic circuit or electronic component can include transistors interconnected to provide positive feedback operating as latches or flip flops, providing for circuits that have two or more metastable states, and remain in one of these states until changed by an external input. Data storage can be based on such flip-flop containing circuits. Data storage can also be based on the storage of charge in a capacitor or on other principles. In some embodiments, the non-volatile memory 538 can be integrated with the control circuit 504.

In various embodiments the monitoring device 150 can include a clock circuit 540. In some embodiments, the clock circuit 540 can be integrated with the control circuit 504. While not shown in FIG. 5, it will be appreciated that various embodiments herein can include a data/communication bus to provide for the transportation of data between components. In some embodiments, an analog signal interface can be included. In some embodiments, a digital signal interface can be included.

In various embodiment the monitoring device 150 can include a communications circuit 542. In various embodiments, the communications circuit can include components such as an antenna 544, amplifiers, filters, digital to analog and/or analog to digital converters, and the like.

In various embodiments, monitoring devices 150 herein are designed so that they can operate using only a battery for power and not deplete the battery for a long period of time such as weeks, months, or even years. As such, in various embodiments operations of the monitoring device 150 can be optimized to conserve energy consumption.

In some embodiments, the control circuit initiates a transitory change in a data recording parameter based on a signal received from the third pressure sensor. In some embodiments, the transitory change in the data recording parameter comprises increasing the resolution of the recorded data. In some embodiments, the transitory change in the data recording parameter includes changing the resolution of the recorded data. In some embodiments, changing the resolution can include increasing or decreasing the sampling frequency.

In some embodiments, the first pressure sensor and the second pressure generate signals discontinuously. In some embodiments, the first pressure sensor and the second pressure generate signals at predetermined time intervals.

Figure 6:
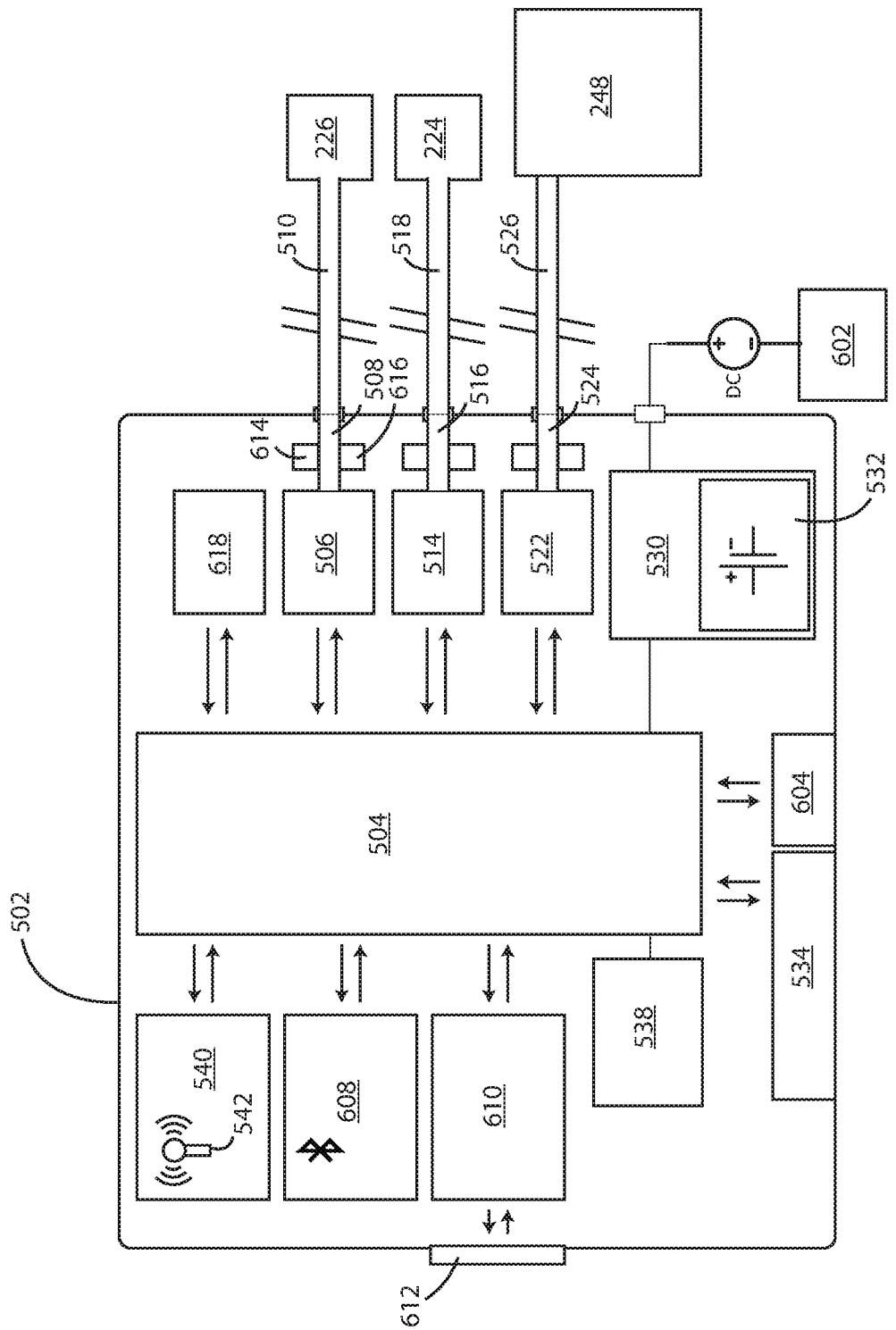
FIG. 6 is a schematic diagram of elements of a monitoring device in accordance with various embodiments herein.

Referring now to FIG. 6, a schematic diagram is shown of elements of a monitoring device 150 in accordance with various embodiments herein. FIG. 6 includes various components as shown in FIG. 5. As depicted in FIG. 6, the monitoring device 150 can also be in electrical communication with an DC power source and/or can include a transformer 602. The monitoring device 150 can also include an input interface 604 and/or user input device.

The monitoring device 150 can also include a low-energy local wireless communication component 608. In some embodiments, the low-energy local wireless communication component 608 can include a Bluetooth component. In some embodiments, the monitoring device 150 can also include a wired V/O interface 610 and one or more wire connection ports or plug receptacles 612.

The monitoring device 150 can include various other sensors. In some embodiments, the monitoring device 150 can also include a temperature sensor 614. The temperature sensor 614 can be in fluid communication with at least one of the first fluid conduit, the second fluid conduit, and the third fluid conduit.

In some embodiments, the monitoring device 150 can also include a humidity sensor 616. In some embodiments, the monitoring device 150 can also include a sound sensor 618, such as a microphone. The sound sensor can 618 can be in fluid communication with at least one of the first fluid conduit, the second fluid conduit, and the third fluid conduit.

Figure 7:
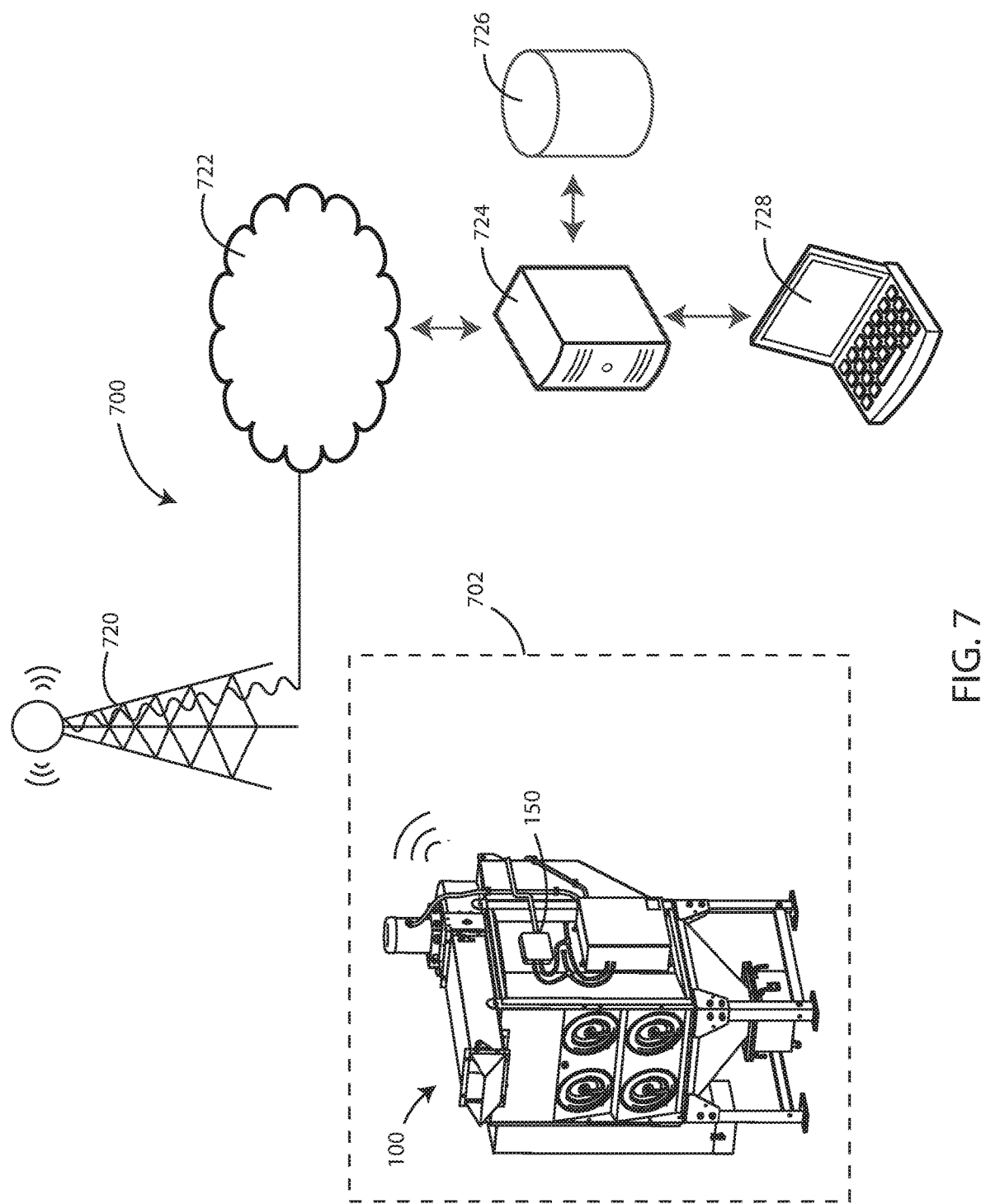
FIG. 7 is a schematic view of a filtration system data communication environment in accordance with various embodiments herein.

Referring now to FIG. 7, a schematic view is shown of a filtration system data communication environment 700 in accordance with various embodiments herein. The communication environment 700 can include an air filtration system 100, such as a dust collector. In some embodiments, the filtration system 100 can be within a work environment 702. The work environment 702 can represent a geographic area in which the air filtration system 100 operates. The work environment 702 can be, for example, a shipping or distribution center, a manufacturing facility, or the like.

In some embodiments, wireless signals from the filtration system 100 can be exchanged with a wireless communication tower 720 (or antenna array), which could be a cellular tower or other wireless communication tower. The wireless communication tower 720 can be connected to a data network 722, such as the Internet or another type of public or private data network, packet-switched or otherwise.

The data network can provide for one-way or two-way communication with other components that are external to the work environment 702. For example, a server 724 or other processing device can receive electronic signals containing data from one or more components such as the filtration system 100. The server 724 can interface with a database 726 to store data. In some embodiments, the server 724 (or a device that is part of the server system) can interface with a user device 728, which can allow a user to query data stored in the database 726. The server 724 and/or the database 726 can be at a distinct physical location or can be in the cloud.

Figure 8:
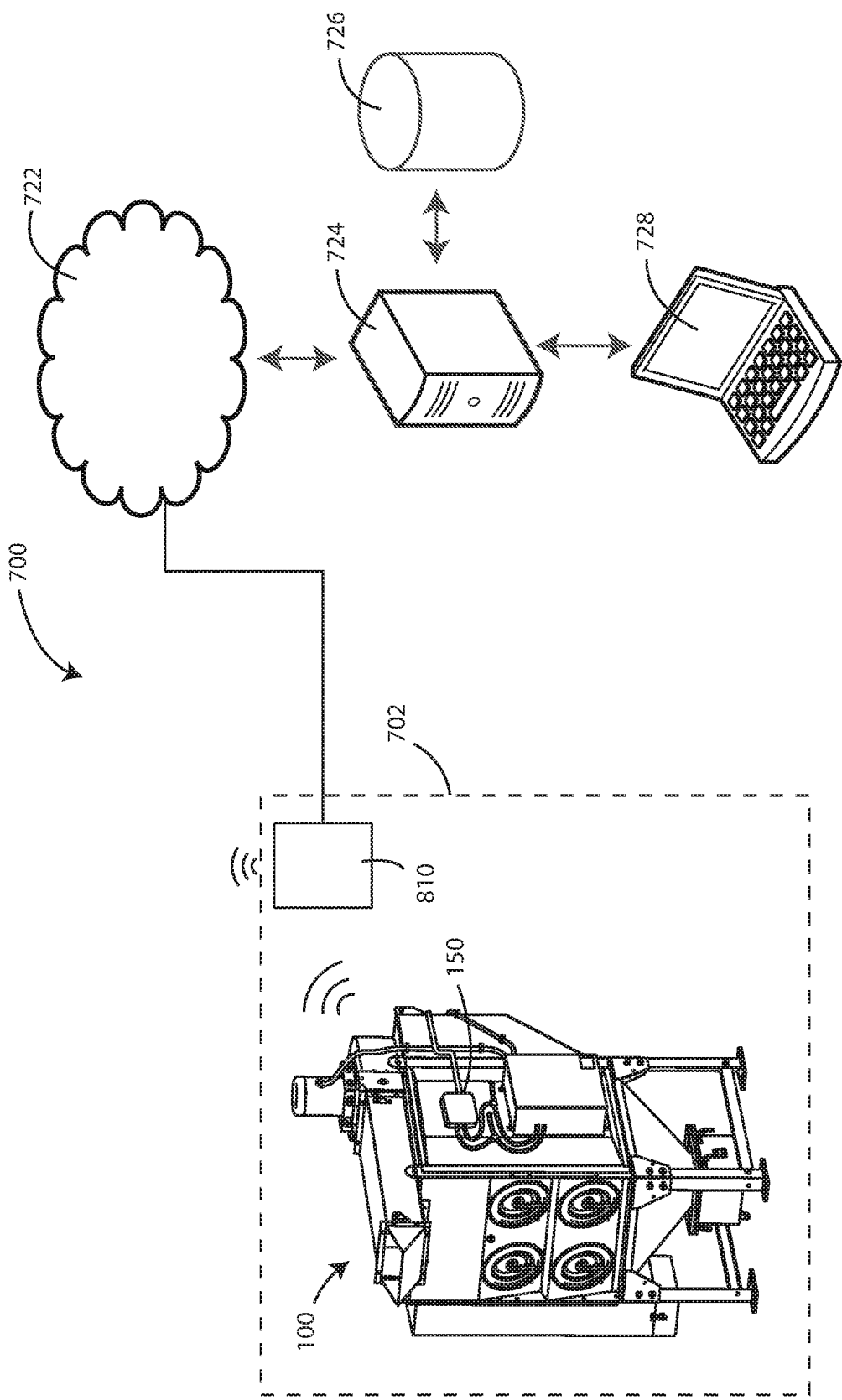
FIG. 8 is a schematic view of a filtration system data communication environment in accordance with various embodiments herein.

Referring now to FIG. 8, a schematic view is shown of a filtration system data communication environment 700 in accordance with various embodiments herein. In some embodiments, a gateway or repeater unit 810 can be disposed within the work environment 702. The gateway or repeater unit 810 can, in some embodiments, communicate wirelessly with the filtration system 100. In some embodiments, the gateway or repeater unit 810 can be connected to an external data network 722, such as the Internet or various private networks. In some embodiments, the data network 722 can be a packet-switched network. In some embodiments, the gateway or repeater 810 can also include data network router functionality.

Figure 9:
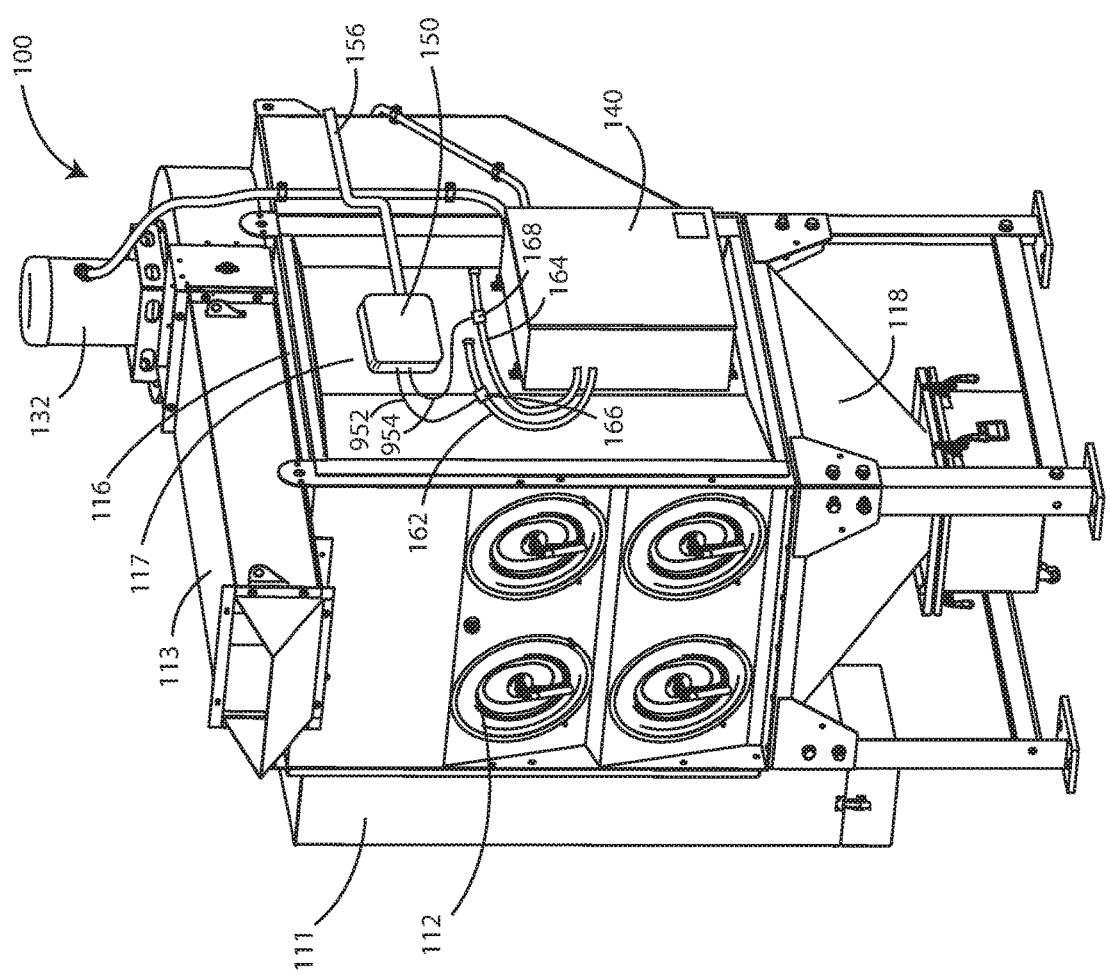
FIG. 9 is a schematic front perspective view of an air filtration system with a monitoring device in accordance with various embodiments herein.

In some embodiments, pressure sensors can be located remotely from the monitoring device 150, but in electrical communication with the monitoring device 150, such as in electrical communication with the control circuit 504. For example, referring now to FIG. 9, a schematic front perspective view of an air filtration system 100 with a monitoring device is shown in accordance with various embodiments herein. In contrast to the system shown in FIG. 1, in this example, pressure sensors are disposed at or in a junction 166, 168 with existing fluid conduits 162, 164 of the air filtration system and signals from the pressure sensors are relayed back to the monitoring device 150 via wires 952, 954.

Figure 10:
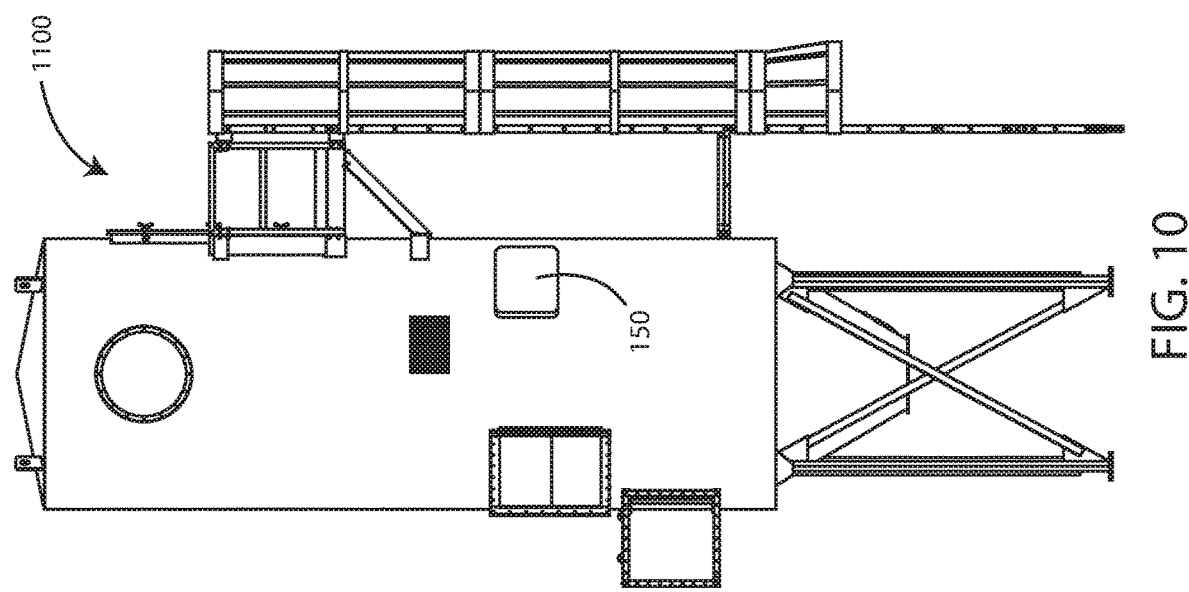
FIG. 10 is a schematic front perspective view of an air filtration system with a monitoring device in accordance with various embodiments herein.

It will be appreciated that many different types of filtrations systems are included herein. While FIGS. 1-3 illustrate a cartridge-based air filtration system, it will be appreciated that bag-type air filtration systems are also included herein. Referring now to FIG. 10, is a schematic front perspective view of an air filtration system 1100 with a monitoring device 150 in accordance with various embodiments herein. In this view, connections to the monitoring device 150 are not shown for ease of illustration. In operation, filter bags can be pulse cleaned periodically to maintain or reduce operating pressure drop, the filter bags tend to be pulse cleaned during operation. During a pulse cleaning operation, a pulse of air is directed through the filter bag in a direction opposite to normal filtering operations. The effect of the pulse of air has two important results. First, the pulse tends to cause the filter bag to flex in response to the increased internal pressure. Such outward flex movement tends to mechanically remove any build-up of particulate in the form of a filter cake on the exterior of the bag. Further, the increase in air flow in the opposite direction through the surface of the filter bag tends to cause the particulates to be removed by the action of the air passing through the porous openings within the filter bag structure. The result of the action of the air passing through the bag in an opposite direction during operations tends to reduce the quantity of any particulate or filter cake that forms on the exterior of the filter bag, thus returning the filter bag to a pressure drop that is typically more commensurate with efficient operation of the structure. Such pulse cleaning operations can be performed using a variety of internal structures within the bag house. The bag house can contain internal fans that can direct a stream of air in the opposite direction through the housing structure. Alternatively, the housing can contain an air orifice or spray head that can be installed within the support structure or can be moved from support structure to support structure to introduce a reverse pulse stream of air into the interior of the bag house. Monitoring devices herein can be connected to such filtration systems such that fluid communication is provided with areas of the filtration system (such as the clean or downstream side of the filter bags and the dirty or upstream side of the filter bags) and sensors in, or otherwise in electrical communication with, the monitoring device. Further aspects of bag-type air filtration systems are described in U.S. Pat. No. 6,740,412, the content of which is incorporated herein by reference.

Aspects have been described with reference to various specific and preferred embodiments and techniques. However, it should be understood that many variations and modifications may be made while remaining within the spirit and scope herein. As such, the embodiments described herein are not intended to be exhaustive or to limit the invention to the precise forms disclosed in the following detailed description. Rather, the embodiments are chosen and described so that others skilled in the art can appreciate and understand the principles and practices.

It should be noted that, as used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

It should also be noted that, as used in this specification and the appended claims, the phrase "configured" describes a system, apparatus, or other structure that is constructed or configured to perform a particular task or adopt a particular configuration to. The phrase "configured" can be used interchangeably with other similar phrases such as arranged and configured, constructed and arranged, constructed, manufactured and arranged, and the like.

All publications and patent applications in this specification are indicative of the level of ordinary skill in the art to which this invention pertains. All publications and patent applications are herein incorporated by reference to the same extent as if each individual publication or patent application was specifically and individually indicated by reference.

The invention claimed is:

1. A monitoring device for a filtration system comprising:
a first fluid conduit;
a first pressure sensor, wherein the first pressure sensor is in fluid communication with the first fluid conduit;
a second fluid conduit;
a second pressure sensor, wherein the second pressure sensor is in fluid communication with the second fluid conduit;
a third fluid conduit and a third pressure sensor in fluid communication with the third fluid conduit, wherein the third fluid conduit is in fluid communication with a compressed gas supply;
a control circuit in electronic communication with the first pressure sensor and the second pressure sensor; and
a housing, wherein the first pressure sensor, the second pressure sensor and the control circuit are all disposed within the housing.

2. The monitoring device of claim 1, wherein the control circuit initiates a transitory change in a data recording parameter based on a signal received from the third pressure sensor.

3. The monitoring device of claim 2, wherein the transitory change in the data recording parameter comprises increasing the resolution of the recorded data.

4. The monitoring device of claim 1, further comprising an accelerometer, wherein the accelerometer is in electronic communication with the control circuit.

5. The monitoring device of claim 4, wherein the accelerometer is disposed within the housing such that vibrations incident upon a contact surface of the housing are attenuated by less than 10% as incident upon the accelerometer.

6. The monitoring device of claim 1, further comprising a microphone, wherein the microphone is in electronic communication with the control circuit.

7. The monitoring device of claim 1, wherein the control circuit is configured to calculate a value correlated to a fluid flow rate through the filtration system based on a static pressure value, wherein the static pressure value is determined by a signal from one of the first pressure sensor and the second pressure sensor.

8. The monitoring device of claim 1, wherein the control circuit is configured to calculate a value correlated to a fluid flow rate through the filtration system based on a differential pressure value and a static pressure value, wherein the differential pressure value is determined by a signal from the first pressure sensor relative to the second pressure sensor and the static pressure value is determined by a signal from one of the first pressure sensor and the second pressure sensor.

9. The monitoring device of claim 1, wherein the first pressure sensor and second pressure sensor generate signals at variable time intervals.

10. The monitoring device of claim 9, wherein the variable time intervals are determined based upon a rate of change of the first or second pressure sensor signals.

11. The monitoring device of claim 1, further comprising a temperature sensor.

12. The monitoring device of claim 1, further comprising a user output device, wherein the control circuit calculates a time for replacement of a filter element and issues a notification regarding the time for replacement through the user output device.

13. The monitoring device of claim 12, wherein the control circuit calculates the time for replacement of the filter element based on
signals from the first pressure sensor and the second pressure sensor; and
an external input.

14. The monitoring device of claim 1, wherein the control circuit initiates an alarm if a predetermined alarm condition has been met.

15. The monitoring device of claim 14, wherein the alarm condition includes at least one of:
a maximum value for a signal received from the first pressure sensor;
a minimum value for a signal received from the first pressure sensor;
a maximum value for a signal received from the second pressure sensor;
a minimum value for a signal received from the second pressure sensor;
a maximum difference between a value for a signal received from the first pressure sensor and a value for a signal received from the second pressure sensor; and
a minimum difference between a value for a signal received from the first pressure sensor and a value for a signal received from the second pressure sensor.

16. An air filtration system comprising:
a housing configured to receive a filter element therein through which a fluid flow passes, the filter element comprising an upstream side and a downstream side; and
a monitoring device comprising:
a first fluid conduit in fluid communication the upstream side of the filter element;
a first pressure sensor, wherein the first pressure sensor is in fluid communication with the first fluid conduit;
a second fluid conduit in fluid communication with the downstream side of the filter element;
a second pressure sensor, wherein the second pressure sensor is in fluid communication with the second fluid conduit;
a third fluid conduit and a third pressure sensor in fluid communication with the third fluid conduit, wherein the third fluid conduit is in fluid communication with a compressed gas supply;
a monitoring device control circuit in electronic communication with the first pressure sensor and the second pressure sensor; and
a housing, wherein the first pressure sensor, the second pressure sensor and the control circuit are all disposed within the housing.

17. The dust collector of claim 16, wherein the filtration system further comprises a filtration system control circuit.

18. The dust collector of claim 17, wherein the filtration system control circuit is not in electronic communication with the monitoring device control circuit.

19. A monitoring device for a filtration system comprising:
a first fluid conduit;
a first pressure sensor, wherein the first pressure sensor is in fluid communication with the first fluid conduit;
a second fluid conduit;
a second pressure sensor, wherein the second pressure sensor is in fluid communication with the second fluid conduit; and
a control circuit in electronic communication with the first pressure sensor and the second pressure sensor;
a housing, wherein the first pressure sensor, the second pressure sensor and the control circuit are all disposed within the housing, and wherein the first fluid conduit comprises a first internal portion disposed within the housing and a first external portion disposed outside the housing, and wherein the second fluid conduit comprises a second internal portion disposed in the housing and a second external portion disposed outside the housing; and
an accelerometer, wherein the accelerometer is in electronic communication with the control circuit, wherein the accelerometer is disposed within the housing such that vibrations incident upon a contact surface of the housing are attenuated by less than 10% as incident upon the accelerometer.

* * * * *